United States Patent Office 3,054,748
Patented Sept. 18, 1962

3,054,748
PROCESS FOR THE CONTROL OF BACTERIA IN WATER FLOODING OPERATIONS IN SECONDARY OIL RECOVERY
Edward B. Hodge, Terre Haute, Ind., assignor to Commercial Solvents Corporation, New York, N.Y., a corporation of Maryland
No Drawing. Filed May 23, 1960, Ser. No. 30,730
7 Claims. (Cl. 252—8.55)

My invention relates to the control of sulfate reducing bacteria in water flooding operations used in the secondary recovery of petroleum oils, and more particularly, to controlling such organisms by incorporating into the flooding water effective amounts of a nitroamine having the following general formula:

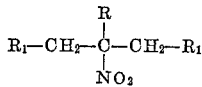

where R is lower alkyl and where $R_1$ is selected from the group consisting of the radical —N—$(R_2)_2$, the morpholino radical and the piperidyl radical and $R_2$ is selected from the group consisting of lower alkyl, lower hydroxyalkyl, and hydrogen.

U.S. Patent No. 2,839,467 lists many of the problems found in the secondary oil recovery art and the means whereby some of these problems have been solved. The problem of controlling sulfate reducing bacteria is ever present and always difficult, as the growth of the microorganisms is not controlled by economically practicable amounts of many bactericides generally utilized in bacterial control and the microorganisms sometimes become resistant to generally used bactericides.

The problems attending the control of other microorganisms are more easily solved but are, nevertheless, present. These microorganisms are generally controlled by moderate amounts of known bactericides.

I have now discovered that noxious microorganisms are economically controlled by my above-described nitroamines. Compounds which are found to be operative in my process include: 2-nitro-2-methyl-1,3-bis(dibutylamino)propane, 2-nitro-2-methyl-1,3-bis(2-hydroxypropyl)aminopropane, 2-nitro-2-methyl-1,3-dimorpholinopropane, 2-nitro-2-methyl-1,3-dipiperidyl propane, and 2-nitro-2-ethyl-1,3-bis(dimethylamino)propane.

The usual procedure for the treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil-bearing subterranean formation. Sampling and checking the water for bacteria will show whether the chemical concentration needs to be raised or may be lowered to control effectively all bacterial growth and to effect an elimination of sulfate reducing bacteria from the water.

Alternately, the bactericides utilized in my process may be added to the oil-bearing formations periodically, for example, once a week, as a high potency concentrate or the undiluted bactericide may be injected into the formation.

I have found that the compounds utilized in my process are active against some strains of bacteria in water at concentrations as low as 2–5 p.p.m. However, it is often preferable to utilize concentrations in excess of about 50 p.p.m. and at times as high as 100 p.p.m. as I have found that even very resistant strains of *Desulfovibrio desulfuricans* are effectively controlled at these concentrations.

It is to be understood, of course, that not all of the compounds utilized in my process are effective to the same degree. The following table sets out concentrations at which I have found representative nitroamines coming within the scope of my invention to be completely effective against a resistant strain of *Desulfovibrio desulfuricans* in water flooding operations.

| Nitroamine: | Effective concentration, p.p.m. |
|---|---|
| 2-nitro-2-ethyl-1,3-bis(dimethylamino)propane | 5 |
| 2-nitro-2-methyl-1,3-bis(dibutylamino)propane | 25 |
| 2-nitro-2-methyl-1,3-dimorpholinopropane | 12 |
| 2-nitro-2-methyl-1,3-bis(2-hydroxypropyl)aminopropane | 50 |
| 2-nitro-2-methyl-1,3-dipiperidylpropane | 100 |

The following examples set out the procedure used in testing my nitroamines for the control of sulfate reducing microorganisms. It is not intended that my invention be limited to the exact compositions or concentrations shown. Rather, it is intended that all equivalents obvious to those skilled in the art be included within the scope of my invention as claimed.

*Example I*

In a water treatment plant, a water concentrate containing 2-nitro-2-methyl-1,3-bis(dibutylamino)propane is continuously added to water to be pumped into a subterranean oil-bearing formation at such a rate that a 25 p.p.m. solution of 2-nitro-2-methyl-1,3-dibutylaminopropane is formed. The nitroamine treated flooding water is pumped into the oil-bearing formation and is completely effective in preventing bacterial plugging of the oil-bearing sands and the piping system utilized in the water flooding operation.

*Example II*

Utilizing the process of Example I, I have found that 12 p.p.m. of 2-nitro-2-methyl-1,3-dimorpholinopropane is effective in controlling sulfate reducing bacteria in water flooding operations.

*Example III*

Utilizing the process of Example I, I have found that 50 p.p.m. of 2-nitro-2-methyl-1,3-bis(2-hydroxypropyl)aminopropane is effective in controlling sulfate reducing bacteria in water flooding operations.

*Example IV*

Utilizing the process of Example I, I have found that 100 p.p.m. of 2-nitro-2-methyl-1,3-dipiperidylpropane is effective in controlling sulfate reducing bacteria in water flooding operations.

*Example V*

Utilizing the process of Example I, I have found that 5 p.p.m. of 2-nitro-2-ethyl-1,3-bis(dimethylamino)propane is effective in controlling sulfate reducing bacteria in water flooding operations.

Now having described my invention, what I claim is:

1. In the process of secondary oil recovery characterized by the step of injecting flooding water into oil-bearing subterranean formations to displace portions of the residual oil therein, the improvement comprising having present in said injected flooding water in excess of about 2–5 p.p.m. of a nitroamine having the following structural formula:

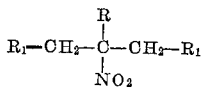

where R is a lower alkyl and where $R_1$ is selected from the group consisting of the radical $-N-(R_2)_2$, the morpholino radical and the piperidyl radical and $R_2$ is selected from the group consisting of lower alkyl, lower hydroxyalkyl, and hydrogen.

2. In a flooding process for the recovery of oil from oil-bearing subterranean formations, the improvement which comprises flooding the oil-bearing subterranean formations with an aqueous liquid containing in excess of 2–100 p.p.m. of a nitroamine having the following structural formula:

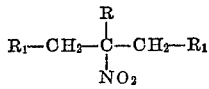

where R is lower alkyl and where $R_1$ is selected from the group consisting of the radical $-N-(R_2)_2$, the morpholino radical and the piperidyl radical and $R_2$ is selected from the group consisting of lower alkyl, lower hydroxyalkyl, and hydrogen.

3. The process of claim 1 wherein the nitroamine is 2-nitro-2-methyl-1,3-bis(dibutylamino)propane.

4. The process of claim 1 wherein the nitroamine is 2-nitro-2-methyl-1,3-bis(2-hydroxypropyl)aminopropane.

5. The process of claim 1 wherein the nitroamine is 2-nitro-2-methyl-1,3-dimorpholinopropane.

6. The process of claim 1 wherein the nitroamine is 2-nitro-2-methyl-1,3-piperidylpropane.

7. The process of claim 1 wherein the nitroamine is 2-nitro-2-ethyl-1,3-bis(dimethylamino)propane.

References Cited in the file of this patent

UNITED STATES PATENTS

| 2,381,408 | Senkus | Aug. 7, 1945 |
| 2,692,231 | Stayner et al. | Apr. 15, 1947 |
| 2,839,467 | Hutchison et al. | June 17, 1958 |
| 2,843,545 | Wolf | July 15, 1958 |
| 2,867,279 | Cocks | Jan. 6, 1959 |
| 2,917,428 | Hitzman | Dec. 15, 1959 |

FOREIGN PATENTS

| 107,419 | Australia | May 25, 1939 |
| 421,189 | Italy | Mar. 19, 1947 |